United States Patent [19]

Schulthess et al.

[11] 4,082,430
[45] Apr. 4, 1978

[54] DRIVING CIRCUIT FOR A MATRIX-ADDRESSED LIQUID CRYSTAL DISPLAY DEVICE

[75] Inventors: Peter U. Schulthess, Zurich; Peter J. Wild, Wettingen, both of Switzerland

[73] Assignee: BBC Aktiengesellschaft Brown, Boveri & Company, Ltd., Baden, Switzerland

[21] Appl. No.: 760,944

[22] Filed: Jan. 21, 1977

Related U.S. Application Data

[60] Division of Ser. No. 562,548, Mar. 27, 1972, abandoned, which is a continuation-in-part of Ser. No. 238,576, Mar. 27, 1972, abandoned.

[30] Foreign Application Priority Data

Mar. 30, 1971 Switzerland ............... 4670/71

[51] Int. Cl.² ............................................. G02F 1/13
[52] U.S. Cl. .................................. 350/333; 340/324 M
[58] Field of Search ............. 350/160 LC; 340/324 M

[56] References Cited

U.S. PATENT DOCUMENTS

| 3,499,112 | 3/1970 | Heilmeier et al. | 350/160 LC X |
| 3,575,492 | 4/1971 | Nester et al. | 350/160 LC |

*Primary Examiner* — Edward S. Bauer
*Attorney, Agent, or Firm* — W. G. Fasse; W. W. Roberts

[57] ABSTRACT

In a driving circuit for a liquid crystal display matrix, a source of a direct or low-frequency voltage is connected to drive the selected row and column electrodes, and a high frequency voltage is connected to the driving circuit so that the high frequency potential is effective in combination with the low frequency or direct voltage at non-frequency voltage is effective at the selected crossovers. The high frequency voltage suppresses changes in the optical properties of the liquid crystal at the non-selected crossovers.

9 Claims, 13 Drawing Figures

DRIVING CIRCUIT FOR A MATRIX-ADDRESSED LIQUID CRYSTAL DISPLAY DEVICE

BACKGROUND OF THE INVENTION

The present application is a divisional application of Ser. No. 562,548 filed Mar. 27, 1975 and now abandoned which in turn is a continuation in part application of Ser. No. 238,576 filed Mar. 27, 1972 and now abandoned.

The present invention relates to a driving circuit for a matrix-addressed liquid crystal display device. The invention is particularly directed to such arrangements of the type in which matrix elements can be driven by the application of address signals in the form of voltages, the signals being applied between at least one row or column electrode and one column or row electrode, respectively.

Display devices of this kind are disclosed, for example, in U.S. Pat. No. 3,332,485 and U.S. Pat. No. 3,499,112. Such devices consist essentially of two mutually parallel glass carrier plates provided with a plurality of parallel strip-like electrodes, and a nematic liquid crystal is provided between the plates. The electrodes of one carrier plate are disposed perpendicularly to those of the other in order to form the rows and columns of a matrix.

If a sufficiently high voltage is applied between an arbitrary row electrode and an arbitrary column electrode, the optical properties of the liquid crystal film will change in the area between the carrier plates in which the energized electrodes are located opposite one another. In this fashion, any matrix element can be optically driven by applying a voltage between the corresponding column and row electrodes.

This drive function (addressing), however, is not unambiguous when currently available liquid crystal substances are employed, because the optical characteristics of the excited matrix element do not differ sufficiently from the other neighboring elements to readily distinguish the excited element.

Figure 1:
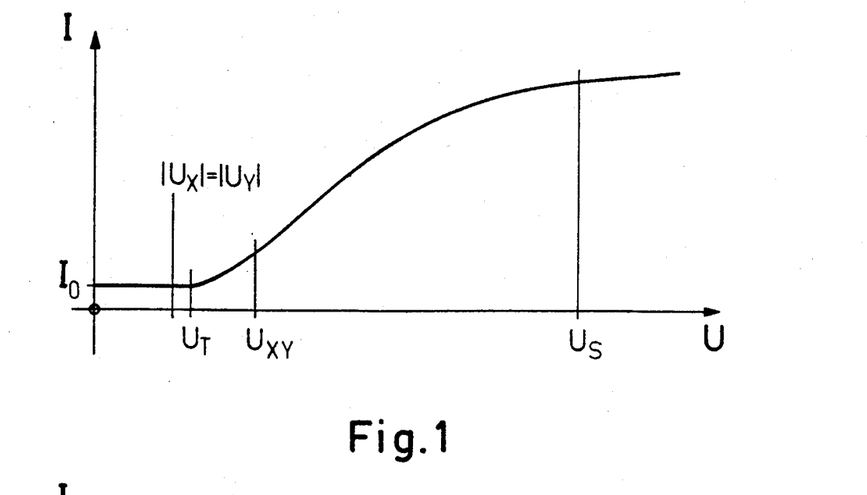
FIG. 1 is a graph depicting the relationship between light intensity and the direct voltage applied to a liquid crystal film.

To explain this deficiency consider the relationship shown in FIG. 1, between light intensity I (plotted on the ordinates) and applied voltage U (plotted on the abscissa). The diagram is based upon a typical intensity/voltage characteristic of the kind exhibited by commercially available nematic liquid crystals. At low voltages $U \leq U_T$ the curve is horizontal with respect to the abscissa and then from $U_T$ it rises gradually to the threshold value defining the change in the optical properties of the liquid crystal. At voltages $U \geq U_{US}$ the rate of increase of intensity falls off substantially. The voltage interval between $U_T$ and $U_S$ is in practice greater than that between $U = O$ and $U_T$. The ratio of the light intensity of I to the intensity $I_o$, is a measure of the contrast which can be achieved.

If a voltage $U_X$ is applied between a row electrode and ground reference and a voltage $U_Y$ is applied between a column electrode and ground reference (we will assume that all the other electrodes are grounded), then if $U_X$ and $U_Y$ are suitably chosen the potential difference $U_{XY}$ between the two electrodes at the point of the coincidence; namely, the matrix element will be greater than the threshold value $U_T$ of the liquid crystal. The relevant matrix element is optically driven and will, for example, exhibit greater ligh scatter or depolarization than its neighbors. This distinction in optical properties, however, is relatively small because the potential difference $U_{XY}$ is smaller than the voltage $U_S$ which would be required to drive the matrix element in an optimum manner.

An increase in the voltage $U_X$ and/or $U_Y$ (i.e. an increase in their magnitude) on column and row electrodes, above the threshold value $U_T$ yields no improvement. Although the coincidence matrix element might be driven to the full extent, the neighboring matrix elements would also be partially driven so the contrast would again be small.

Matrix-addressable display devices are known ("Liquid Crystal Matrix Displays", 1969, IEEE ISSCC, p. 52 and "Liquid Crystal Matrix Displays", Lechner, Marlowe, Nester and Tults, Proc. IEEE Vol. 59, No. 11, Nov. 1971, pp. 1566–1579.) in which each matrix element is provided with circuit elements to overcome these deficiencies. However, such display systems are extremely complex and expensive.

OBJECTS OF THE INVENTION

It is therefore the object of this invention to provide a circuit arrangement for driving matrix-addressed liquid crystal display devices which does not exhibit the deficiencies and drawbacks of known arrangements, is readily fabricated and which provides a significant improvement in contrast.

SUMMARY OF THE INVENTION

In accordance with the invention these objects are achieved in a display device of the kind described in the introduction by providing direct or low frequency drive signal sources connected to energize the row and column electrodes of the matrix element to be driven. The drive signals have a potential difference greater than the direct or low frequency threshold voltage governing the change in the optical properties of the liquid and may include high frequency potentials which fundamentally have no influence upon said optical properties. The row and column electrodes of all the other matrix elements are either energized by direct or low frequency potentials with a potential difference smaller than said threshold voltage, or by direct or low frequency potentials with a potential difference greater than said threshold voltage, in each case with high frequency potentials superimposed upon them which do affect the optical properties.

In this context, the invention makes use of the fact that the inherent characteristic of nematic liquid crystals, which is hereinafter referred to as the DS-effect or in other words dynamic scattering, the formation of Willaims domains or other relevant hydrodynamic instabilities is frequency dependent. With a predetermined constant amplitude pure a.c. voltage excitation, the DS-effect disappears at a specific cut-off frequency. Expressed in other terms, this means that within a specific frequency range the threshold value governing the appearance of the DS-effect, increases with rising frequency. A further explanation of this effect is given by Phys. Rev. Letters 25, No. 24, 1642 (1970).

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Before proceeding with the discussion of examples of display devices in accordance with the invention, the physical basis underlying the invention will first be explained in greater detail.

Figure 2:
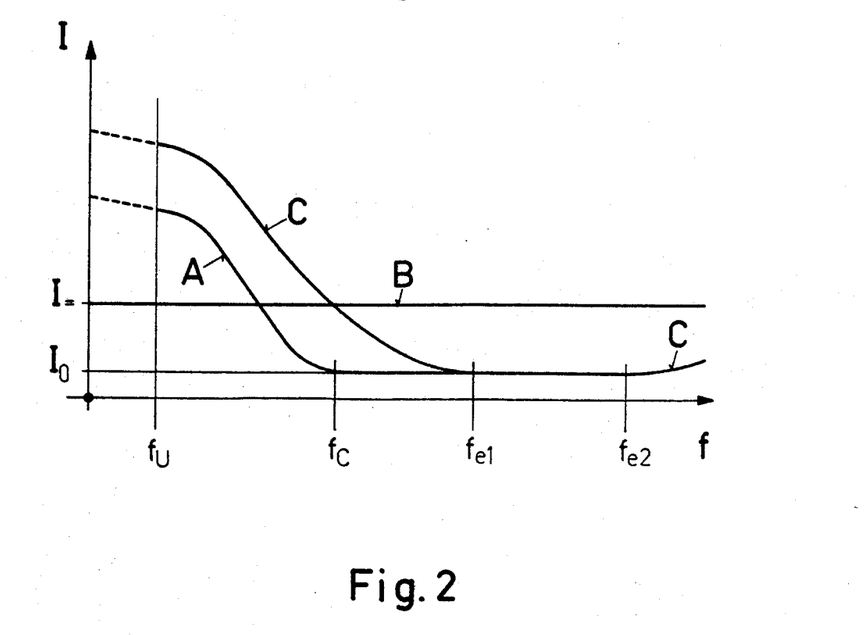
FIG. 2 is a graph in which the obtainable light intensity has been plotted as a function of the frequency of the voltage applied to the liquid crystal film.

With pure a.c. voltage excitation of a liquid crystal film arranged between two carrier plates provided with electrodes, assuming that the a.c. voltage has a constant amplitude, the DS-effect has the form of frequency dependence illustrated by way of example by curve A in FIG. 2. With pure d.c. voltage excitation, of course, there is no frequency dependence (symbolized in FIG. 2 by curve B).

The situation is quite different, however, if a direct voltage component is superimposed upon the a.c. voltage signal. The typical behavior of the frequency dependence of this kind of signal is illustrated by way of example in FIG. 2, curve C. It will be seen that at low frequencies the direct voltage component reinforces the DS-effect due to the a.c. voltage component. Above the cut-off frequency $f_c$, the a.c. voltage component on its own produces no macroscopically detectable DS-effect. If d.c. and a.c. voltage components are combined in an appropriate ratio (e.g. $V_{DC}: V_{AC} = 1:3$), then the DS-effect reaches a minimum value when the frequency is increased.

If the direct voltage proportion does not exceed the (direct voltage) threshold (which determines the DS-effect) of the liquid crystal by more than an amount which is governed by the particular liquid crystal substance, then at a lower compensating frequency ($f_{e1}$ in the diagram of FIG. 2), complete suppression of the DS-effect can be achieved on application of a combined d.c. and a.c. voltage signal. In this case, in a frequency range between $f_{e1}$ and $f_{e2}$ (FIG. 2) a visual appraisal shows no detectable departure from the quiescent optical state of the display system.

At an upper cut off frequency ($f_{e2}$ in FIG. 2), a marked DS-effect again occurs and this increases very slowly with increasing frequency asymptotically reaching the value (curve B in FIG. 2) defined by the d.c. voltage component alone, at very high frequencies. The reason for this behavior is that at high frequencies the high frequency resistance of the electrode is no longer negligible.

Summarizing, then it can be stated that with a suitable choice of the frequency of the a.c. voltage component and of the ratio between the amplitudes of d.c. and a.c. voltage components, the DS-effect brought about by the d.c. voltage component can be suppressed.

Thus, if combined signals of the above-defined type are applied to a row electrode and a column electrode of a display system of the kind described in the introduction, then none of the matrix elements assigned to these electrodes with the exception of the coincidence element, will exhibit any DS-effect. The reason for this behavior of the system resides in the fact that in the coincidence element, a constant potential difference, determined exclusively by the direct voltage components, prevails between row and column electrodes, while in the case of the other matrix elements potential differences are effective which are composed of the combined d.c. and a.c. voltage components.

As the diagram of FIG. 2 also shows, the DS-effect is virtually frequency independent in the range between $f = 0$ (direct voltage and $f = f_u$. In known liquid crystal substances, the frequency $f_u$ is around 30 to 60 C/s for example. This means that it is possible not only to superimpose d.c. and a.c. voltage signals but also to combine low frequency a.c. voltage signals having a frequency of up to about 60 C/s, with high frequency signals, without in any way changing the effect which can be attained.

While it has been recognized, for example, in U.S. Pat. No. 3,575,492 and the above article of Lechner et al that the high frequency a.c. waveform of, for example, 10 to 40 kHz may be employed, in the absence of all other excitation to the liquid crystal substance, to effect a fast "turn-off" of the DS-effect, each of these references discloses the application of the high frequency voltage to the liquid crystal substances only after the low frequency or d.c. excitation voltage has been removed. The references thus have not recognized the advantages of employing the inhibiting effect of a high frequency voltage, when it is superimposed upon the direct or low frequency voltage, as will be discussed in the following paragraphs. Thus, in each of these references, complex switching arrangements or the use of nonlinear threshold devices are required at each of the junctions of a matrix in order to inhibit the DS-effect at all but selected matrix elements.

U.S. Pat. No. 3,575,492 refers to improvements in contrast ratio by employing a turn-off method as above discussed, wherein a high frequency voltage is applied to a liquid crystal substance following the removal of d.c. excitation therefrom. Liquid crystal cells having liquid crystal layers of relatively great thickness, i.e. for example, 10μ or greater and/or having inhomogenous surface alignment exhibit fluctuation of the orientation of the liquid crystal molecules that reduce the transparency of such cells. A high frequency field of sufficient strength causes a more homogenous alignment of the molecules. At the filing date of U.S. Pat. No. 3,575,492 methods for homogenous surface alignment were not yet well developed, and as a consequence an improvement in contrast was noticeable in the arrangement of this reference. In present-day liquid crystal matrix structures, however, the liquid crystals do not have inhomogenous surface alignment, and the liquid crystal cells generally are provided with liquid crystal layers having thicknesses less than about 10μ so that the contrast enhancement referred to in U.S. Pat. No. 3,575,492 would not occur in presentday liquid crystal cells having liquid crystal layers of thicknesses less than about 10μ. In the arrangements of the present invention, as will be discussed in the following paragraph, contrast enhancement appears between adjacent selected and non-selected matrix elements regardless of the thickness of the liquid crystal layers employed.

Figure 3:
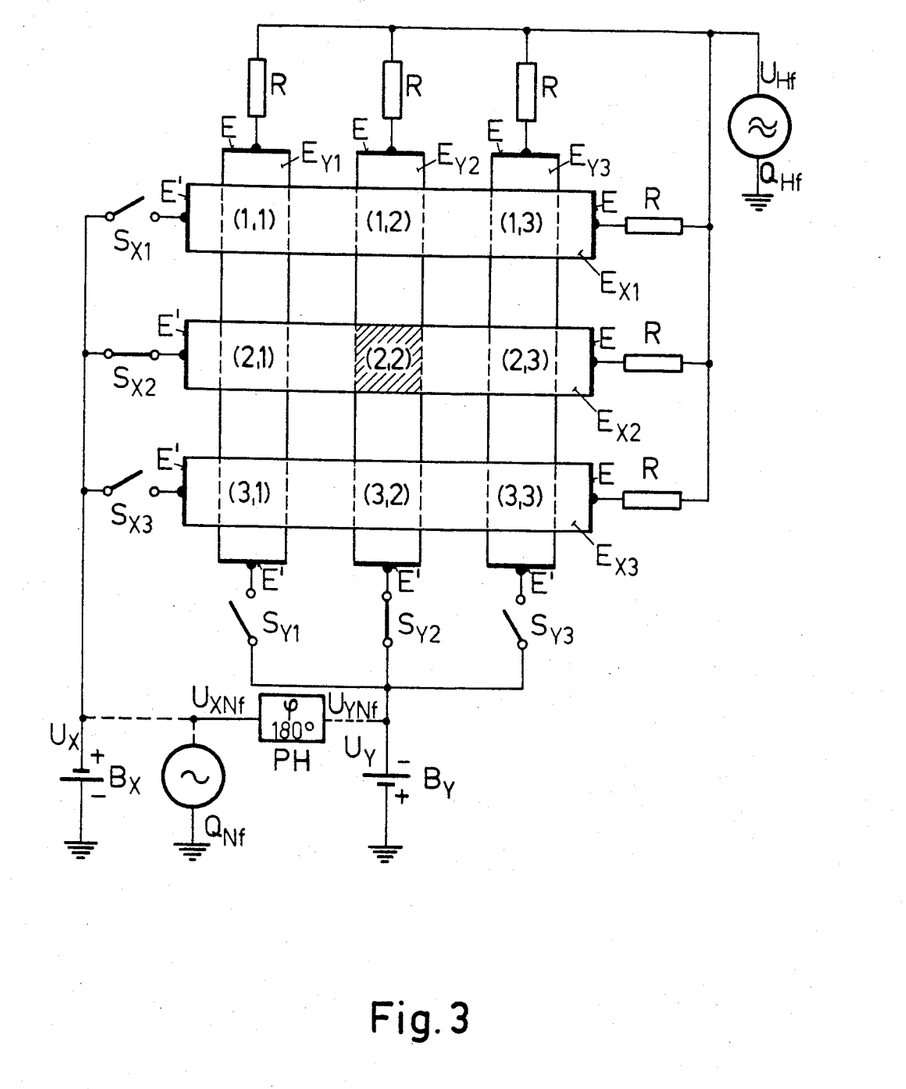
FIG. 3 is a circuit diagram of a display device in accordance with one embodiment of the invention.

Referring now to FIG. 3, therein is illustrated one embodiment of a liquid crystal display device according to the invention. All details which do not directly contribute to an understanding of the invention insofar as they are of a constructional nature, have been omitted in order to avoid confusion. Detailed descriptions of display devices are found in numerous relevant publications and form part of the prior art, e.g. U.S. Pat. No. 3,322,485. This also applies equally to the additional examples illustrated in FIGS. 4 to 7 and 10 to 12, described hereinafter.

In FIG. 3, the actual matrix is constituted by row electrodes $E_{Xi}$ ($i = 1, 2, \ldots$) and column electrodes $E_{Yk}$ ($k = 1, 2, \ldots$), of which only row electrodes $E_{X1}$, $E_{X2}$, and $E_{X3}$ and column electrodes $E_{Y1}$, $E_{Y2}$ and $E_{Y3}$ have been illustrated. The electrodes are applied by conventional techniques to carrier plates of glass, for example, which have not been shown, and are located opposite one another at spacings of, for example, 5 to 50μ. In the space between the electrodes there is a liquid crystal film, for example, a nematic crystal such as a "Nematic Liquid Crystal" as produced by the firm Liquid Crystal Industries; Turtle Creek, Pennsylvania, USA.

Each column and row electrode is provided, for example, at both ends with terminal electrodes E, E'. Each electrode E is connected via a separate resistor R to one terminal of a high frequency source $Q_{Hf}$. The terminal electrodes E' are connected to separate switches $S_{Xi}$, $S_{Yk}$ ($i, k = 1, 2, 3$). By means of these switches, each row electrode can separately be connected to a first battery $B_X$ and each column electrode can be separately connected to a second battery $B_Y$. The batteries are oppositely poled. For example, the positive pole of the battery $B_Y$ and the negative pole of the battery $B_X$ are grounded. However, the batteries can equally well be poled in a manner which is the reverse of this situation.

If the switches $S_{X2}$ and $S_{Y2}$ are closed, then in the matrix element (2,2); namely, the coincidence point between the electrodes $E_{X2}$ and $E_{Y2}$, a constant potential difference $U_{XY} = U_X - U_Y$ develops. Since the high frequency voltage $U_{Hf}$ is applied to all the electrodes, the two electrodes $E_{X2}$ and $E_{Y2}$ are simultaneously at the same high frequency potential $U_{Hf}$ with respect to ground. The elements (1,2), (2,1), (3,2), (2,3) immediately adjacent the matrix element (2,2) are not optically driven because the corresponding electrodes are at d.c. voltages $U_X$ and $U_Y$, and a high frequency potential $U_{Hf}$. By virtue of the drive technique in accordance with the invention, the effects described in the preceding paragraphs with respect to FIG. 2 are created, that is, the d.c. voltage component is suppressed at the elements (1,2), (2,1), (3,2) and (2,3) by the high frequency voltage superimposed upon it.

If, considering the arrangement of FIG. 3, the batteries $B_X$ and $B_Y$ are replaced by a low frequency voltage source $Q_{Nf}$ and a phase reversal stage PH (this is indicated by way of example in FIG. 3, the connecting lines to the matrix having been shown in broken lines), then the display device performs the same functions as one operated on d.c. voltages. The row electrodes are supplied with a low frequency voltage, which is opposite phase with respect to that applied to the column electrodes. Thus, in the coincidence element, a pure low frequency potential difference is active and this, if of sufficiently high amplitude, generates the DS-effect.

The selection of the frequency of the output voltage $U_{Hf}$ from the high frequency source $Q_{Hf}$ is dependent upon the liquid crystal substance in use, and, for example, in the case of the nematic liquid crystal, is between 1000 and 1200 C/s with an optimum amplitude of 70 volts. High frequency signals of this kind are suitable for the suppression of the optical effects of direct voltages ranging up to a maximum of 20 volts.

The magnitudes of the battery voltages $U_X$ and $U_Y$ depend upon the threshold $U_T$ of the chosen liquid crystal substance. At a threshold value of $U_T = 6$ volts, these will, for example, be $U_X = U_Y = 20$ volts, so that in the coincidence element a potential difference in the order of 40 volts is effective. Since, in accordance with the invention, the "half-driven" matrix elements are not distinguishable optically from the elements which are not driven at all, excellent contrast is achieved (see the diagram of FIG. 1).

In a practical embodiment of the above described display device, the switches $S_{Xi}$ and $S_{Yk}$ can be designed as relays. Likewise, bipolar electronic switches such, for example, as field effect transistor arrangements, etc. are suitable for this purpose.

Figure 4:
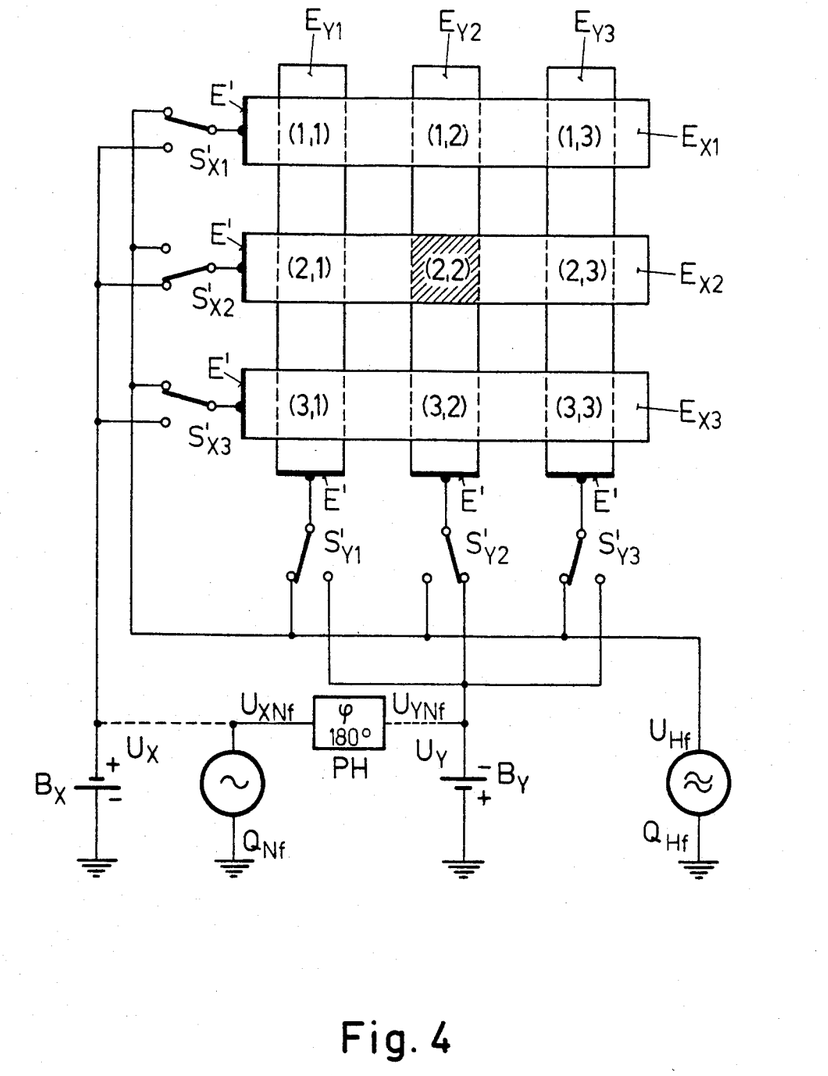
FIG. 4 is a circuit diagram of a display device constituting a modification of that shown in FIG. 3.

FIG. 4 illustrates a second embodiment of a display device in accordance with the invention, this arrangement being a modification of FIG. 3. This example differs from that of FIG. 3 in the manner of connecting the electrodes. The switches $S_{Xi}$ and $S_{Yk}$ are replaced by change-over switches $S'_{Xi}$ and $S'_{Yk}$ which enable arbitrary connection of the battiers $B_X$ and $B_Y$ on the one hand and the high frequency source $Q_{Hf}$ on the other, with the row and column electrodes.

As in the example of FIG. 3, the batteries $B_X$ and $B_Y$ can alternatively be replaced by a low frequency source $Q_{Nf}$ with a succeeding phase reversal stage PH.

Figure 5:
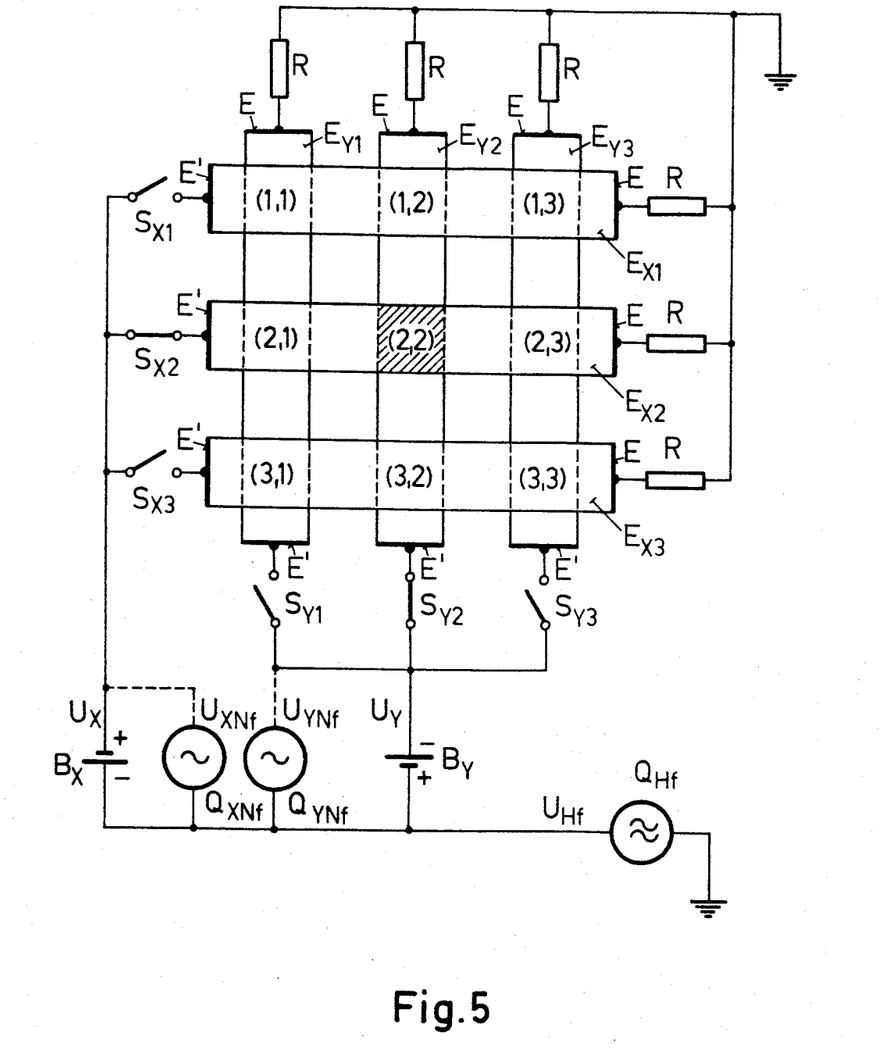
FIG. 5 is a circuit diagram of a display device in accordance with another embodiment of the invention, this embodiment being distinguished from FIGS. 3 and 4 in the use of a different drive arrangement.
Figure 6:
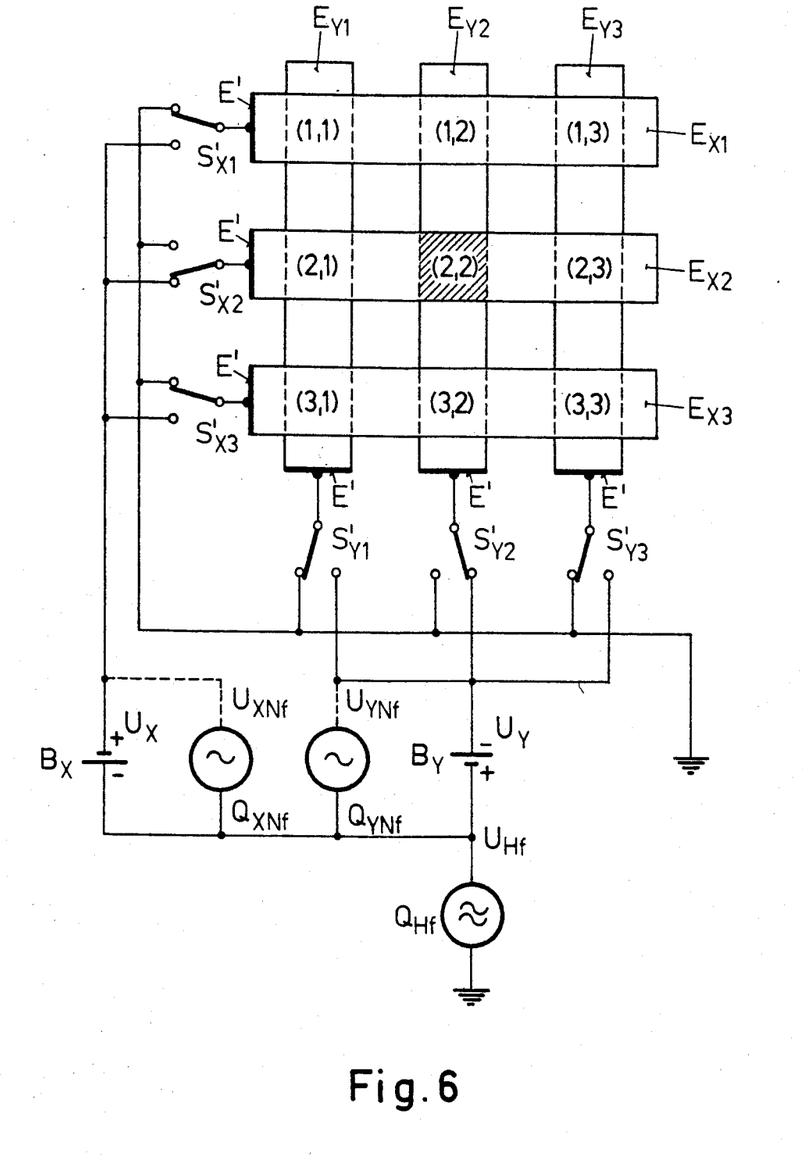
FIG. 6 is a circuit diagram of a modification of the arrangement shown in FIG. 5.

In the arrangement of FIG. 5, a further embodiment of the invention is illustrated. Here, the high frequency source $Q_{Hf}$ is coupled in a different manner. The negative pole of the battery $B_X$ and the positive pole of the battery $B_Y$ are no longer grounded but are connected instead to one terminal of the high frequency source $U_{Hf}$, whose other terminal is grounded. The resistors R are directly grounded. Aside from these changes, the construction and mode of operation of this display device corresponds to that of the system shown in FIG. 3.

As in the case of the system shown in FIG. 4 in the display device of FIG. 5 the switches $S_{Xi}$ and $S_{Yk}$ can be replaced by change-over switches $S'_{Xi}$ and $S'_{Yk}$. This modification is illustrated by way of example in FIG. 6.

Figure 7:
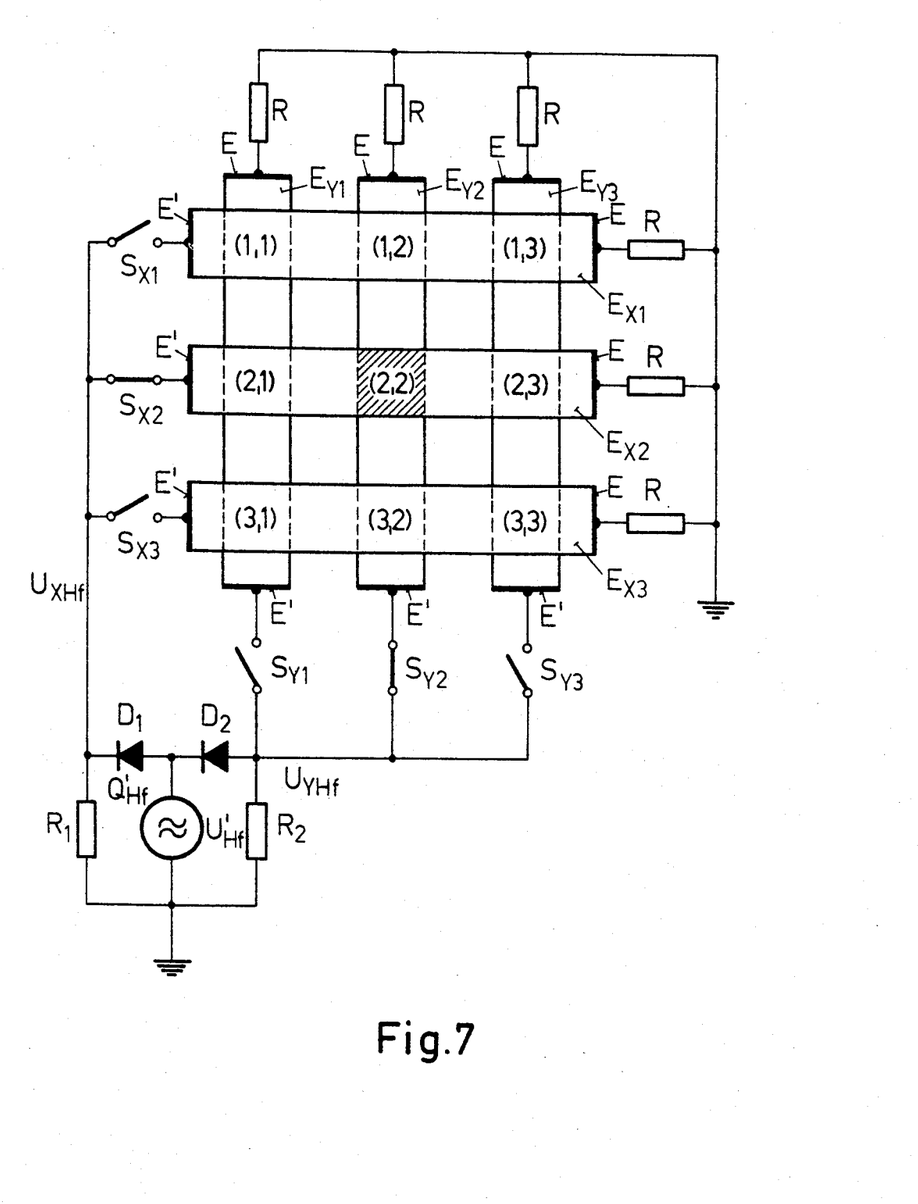
FIG. 7 is a circuit diagram of a further example of a display device in accordance with the invention, illustrating one advantageous arrangement for producing address signals.

Another embodiment of a display device in accordance with the invention is illustrated by way of example in FIG. 7. In this arrangement separate d.c. or low frequency sources of a high frequency source are not required. From an a.c. voltage produced by a source $Q'_{Hf}$ and containing no d.c. voltage component (diagram $a$ in FIGS. 8 and 9), a network constituted by two diodes $D_1$ and $D_2$ as well as two resistors $R_1$ and $R_2$ produces two voltages $U'_{XHf}$ and $U'_{YHf}$ which have opposite phases (diagrams $b$ and $c$ in FIGS. 8 and 9) and each of which has a d.c. voltage component and an a.c. voltage component. These voltages are supplied via switches $S_{Xi}$ and $S_{Yk}$ to the row and column electrodes respectively. Each of the column and row electrodes is grounded by way of a separate resistor R so that when they are not being driven, these electrodes are at ground potential. Accordingly, voltages are applied to the matrix elements which correspond to the driven electrodes and if the amplitude $A_o$ of the voltage $U'_{Hf}$ and its frequency $f'_{Hf}$ are suitable chosen, the voltages produce no DS-effect except at the coincidence elements (matrix element (2,2) in FIG. 7).

Figure 8:
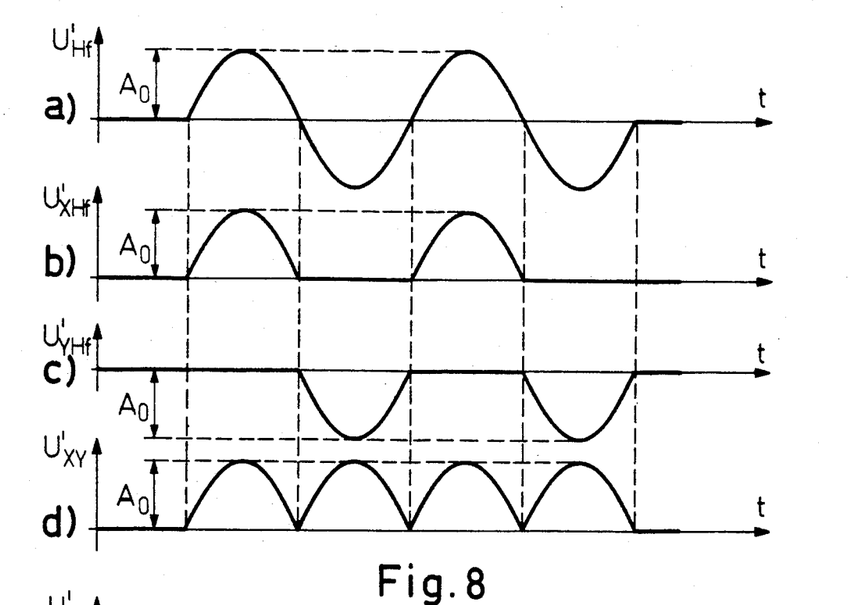
FIG. 8 is a voltage time diagram illustrating address signal production in the arrangement of FIG. 7 when sinusoidal signals are employed.
Figure 9:
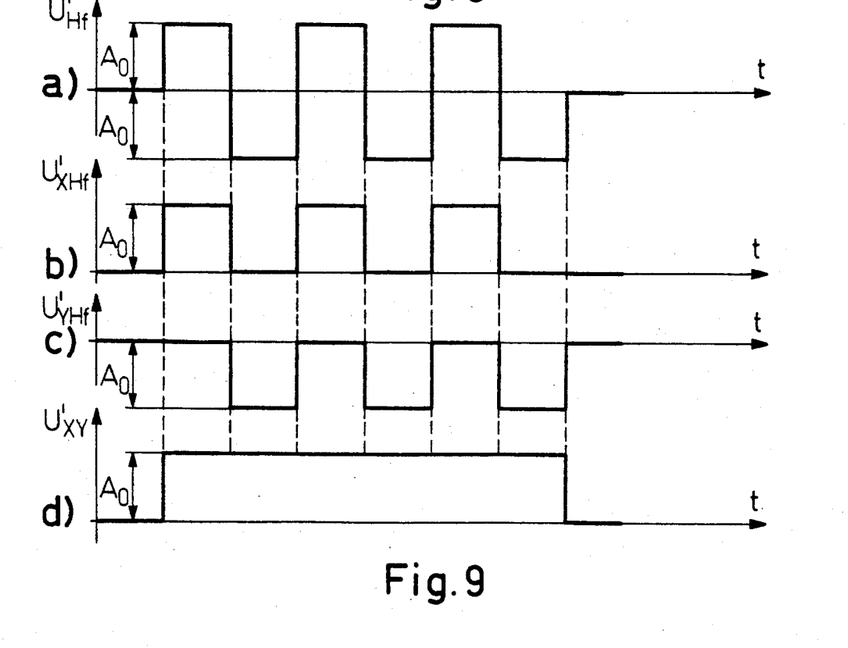
FIG. 9 is a voltage time diagram illustrating address signal production in the arrangement of FIG. 7 when square wave signals are employed.

The potential difference $U'_{XY}$ at the coincidence element (2,2) is a result of the difference between the voltages $U'_{XHf}$ and $U'_{YHf}$ (diagram $d$ in FIGS. 8 and 9). This difference voltage $U'_{XY}$ has a relatively large d.c. voltage component in the case of a sinusoidal a.c. voltage $U'_{Hf}$ (FIG. 8), or is a pure d.c. voltage in the case of a square-wave a.c. voltage of arbitrary mark-space ratio (FIG. 9) assuming ideal splitting in the diode resistor network.

Under the conditions set out in the following example, in an embodiment of a display device in accordance with FIG. 7, reliable and unambiguous addressing of an arbitrary matrix element was achieved:

Substance: Nematic Liquid Crystal (0/70) of the firm Liquid Crystal Industries; Turtle Creek, Pennsylvania, U.S.A.

Liquid Crystal film thickness: 12μ
Low ohmic tin dioxide electrodes
Amplitude $A_o$ of $U'_{Hf}$: 30 volts
Frequency $f'_{Hf}$: 500 C/s to 1100 C/s (corresponds to the range $f_{e1}$ to $f_{e2}$ in FIG. 2).

The direct voltage proportions in the voltages supplied to the column and row electrodes results in the coincidence element in an effective potential difference of $U'_{XY}$ whose direct voltage component is about 20 volts, if the a.c. voltage signal $U'_{Hf}$ is sinusoidal.

When using a square-wave voltage (FIG. 9, diagram $a$) in the coincidence element, with ideal square-wave voltages (diagrams $b$ and $c$ of FIG. 9) a pure direct voltage (diagram $d$ in FIG. 9) is effective. Measurements on the same display device as described above, using a mark space ratio of 1:1 and amplitude $A_o = 20$ volts, gave good contrast. The frequency range for good suppression in the "half-driven" matrix elements was comparable with that mentioned above.

The circuit arrangement in accordance with the invention can advantageously also be used for the simultaneous optical driving of one or more matrix elements in a row or column.

Figure 10:
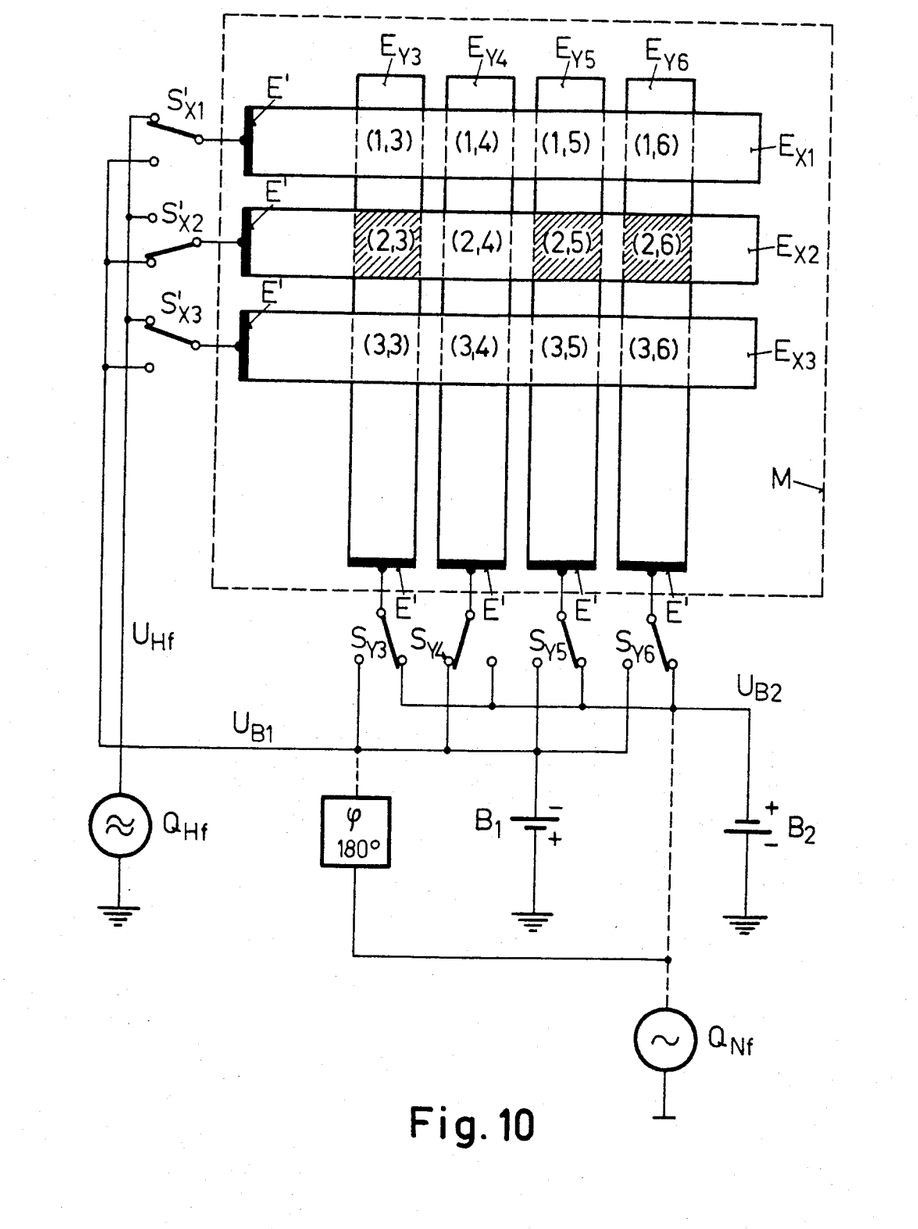
FIG. 10 is a circuit diagram of a circuit in accordance with the invention for driving display devices in line fashion.

An example of a line drive system is shown in FIG. 10. As in the previous arrangements, the matrix consists of row and column electrodes of which the row electrodes $E_{X1}$ to $E_{X3}$ and the column electrodes $E_{Y3}$ to $E_{Y6}$ are shown. The row electrodes can each be selectively connected via change-over switches $S'_{Xi}$ to a high frequency source $Q_{Hf}$ or a battery $B_1$. The column electrodes can be connected to the battery $B_1$ or to a further battery $B_2$ by means of the change-over switch $S'_{Yk}$. The battery voltages $U_{B1}$ and $U_{B2}$ considering a threshold voltage $U_T = 6$ volts in the liquid crystal, amount for example to $-15$ volts and $+15$ volts (both of these voltages are measured with respect to ground). The amplitude of the high frequency voltage $U_{Hf}$ produced by the high frequency source $Q_{Hf}$ is, for example, $A_o = 60$ volts.

In the arrangement of FIG. 10, by way of example, the matrix elements (2,3), (2,5) and (2,6) are optically driven. The switch $S'_{X2}$ places the row electrode $E_{X2}$ at a potential of $-15$ volts with respect to ground and the column electrodes $E_{Y3}$, $E_{Y5}$ and $E_{Y6}$ are placed by their associated switches at a potential of $+15$ volts with respect to ground. No potential differences are applied to the undriven matrix element (2,4) of the second row while combined address signals of the kind described above are applied to the other matrix elements. Accordingly, it is only the desired matrix elements (these are indicated by cross hatching), that a potential difference of 30 volts is active which produces the DS-effect and brings about a change in the optical properties of the liquid crystal film.

It is evident in the arrangement of FIG. 10 that the row electrodes can be interchanged with the column electrodes. Also it is possible in each case to optically drive only one matrix element of a row or column. Compared with the aforedescribed embodiments, this kind of drive system has the advantage that only half of the switches have to be designed for high amplitude high frequency voltages. This fact is a particular advantage when the switching elements are designed as electronic switches.

It is also possible in the system of FIG. 10 in a manner similar to that in the arrangements described above, to replace the batteries $B_1$ and $B_2$ with a.c. voltage sources which produce low frequency signals of opposite relative phase. It is particularly advantageous to provide only one a.c. voltage source $Q_{Nf}$ which replaces the battery $B_2$ (in FIG. 10, this is indicated by the broken line connecting line) and in order to generate the opposite phase low frequency voltage $U_{XNf}$ to provide a phase reversal stage PH supplied by this source. The output of the stage PH is connected to those switch terminals which would otherwise be connected to the negative pole of the battery $B_1$.

It has been found that the electrode material, e.g. tin oxide, of display devices is subject to decomposition when the devices are operated on direct voltages, and this decomposition can greatly shorten the life of the systems. In order to avoid this drawback, in each of the above embodiments of the invention the alternative of operating with low frequency a.c. voltages instead of direct voltages has been disclosed. However, it is possible to dispense with the use of low frequency a.c. voltages if the polarity of the direct voltages to be applied is reversed in a certain rhythm.

Figure 11:
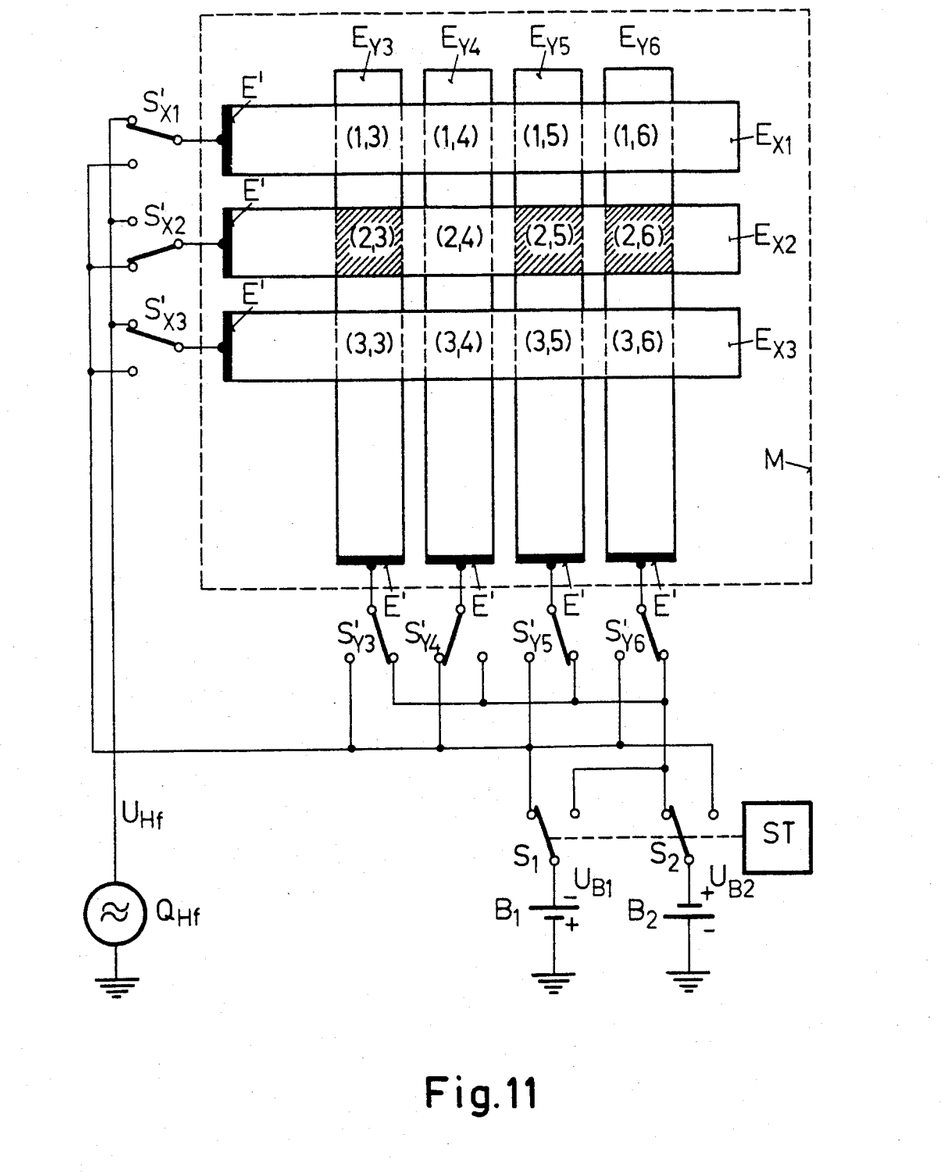
FIG. 11 is a circuit diagram of a modification of the arrangement shown in FIG. 10 in which additional circuit elements have been provided in order to improve the service life of the display system.

This polarity reversal can be achieved quite simply by an additional change-over switch as illustrated by way of example in the embodiment of FIG. 11. With the exception of the additional change-over switches $S_1$ and $S_2$ which can be substituted by a single two-pole change-over switch, this system corresponds with that shown in FIG. 10. The change-over switches can be operated manually or by means of a control unit ST. The control unit can, for example, contain a conventional bistable trigger stage which with the aid of suitable control signals supplied from an external source of the control unit, actuates the change-over switches $S_1$ and $S_2$. For example, after the "recording" of one or more rows or columns, a pulse can be supplied to the unit, reversing the polarity of the potentials of the electrodes.

It is obvious that this kind of reversal of the battery polarities can also be effected in the examples of FIGS. 3 to 7 in precisely the same way.

In a further advantageous modification of the arrangement shown in FIG. 10, the change-over switches $S'_{\gamma k}$ are connected to additional voltage dividers, for example, potentiometers. In this fashion, depending upon the division ratio, the grey level of the optically driven matrix element or elements can be individually adjusted.

Figure 12:
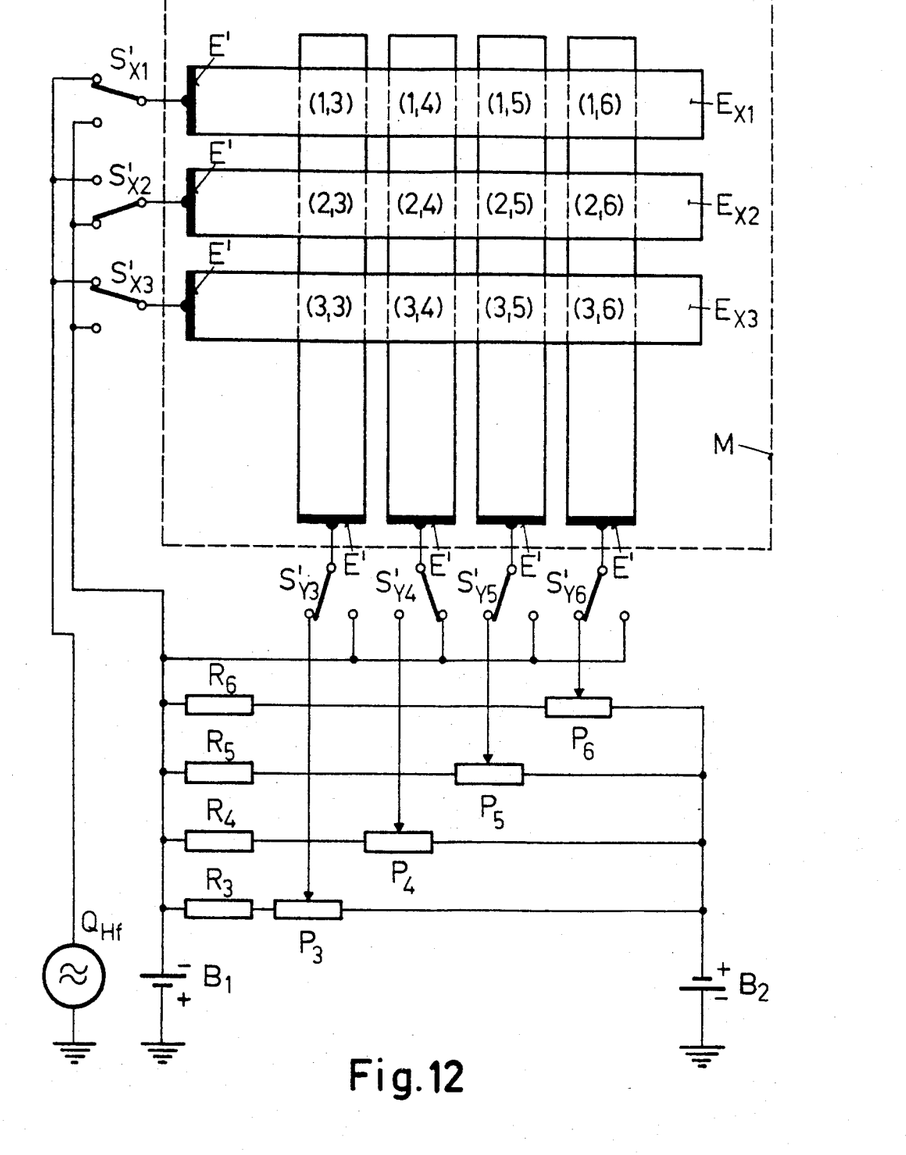
FIG. 12 is a circuit diagram of a further modification of the circuit arrangement of FIG. 10, in which one technique for individually adjusting the grey levels of the driven matrix elements is indicated.

This embodiment is shown by way of example in FIG. 12. A plurality of series circuits each consisting of a resistor $R_k (k = 3, \ldots, 6)$ and a potentiometer $P_k$ are connected between the ungrounded terminals of batteries $B_1$ and $B_2$. The ratio of the resistances of the potentiometer and those of their associated resistors, is selected so that a voltage drop is developed across the resistors which corresponds to the threshold level $U_T$ of the liquid crystal. Thus, if $U_T = 6$ volts the potentiometer terminals associated with the resistors may have potentials of 9 volts with respect to ground. In this fashion, at each desired matrix element a potential difference of between 6 volts (still no change in optical properties) and 30 volts (optimum contrast) can be selected.

The invention is not, of course, restricted to display devices of the kind proposed in FIGS. 3 to 7 and 10 to 12. These are purely intended as examples. In the practical design of the matrices, the intervals between neighboring row and column electrodes can be varied in an arbitrary manner although in all cases an insulating space must be left between the electrodes. Likewise, the angle subtended between mutually opposite electrodes may be other than 90°. Also, the geometry of the electrodes does not have to satisfy the forms illustrated. Row and column electrodes can differ in design and it is furthermore possible to arrange several matrices one behind the other in the so called multi-layer technique.

The circuit arrangements thus far disclosed were designed primarily to improve contrast in display devices. The optically driven matrix element or elements which stand out with respect to its neighboring, non-driven elements by virtue of a higher light intensity or depolarization, only remain in the driven state as long as the address signals are applied to the corresponding electrodes. The information is erased when these signals are removed. Display devices of the disclosed kind are thus excellently suited for use as electro-optical addressing devices for page-composers.

If the information is to be stored this can, for example, be done by transmitting the information fed into the display device, onto a photographic plate or film illuminated by the driven matrix elements. If, however, the information is to be stored in a liquid crystal display, then an additional device is needed in which the actual information is relayed via an optical coupling device to a storage medium and thence to an ensuing liquid crystal display.

Figure 13:
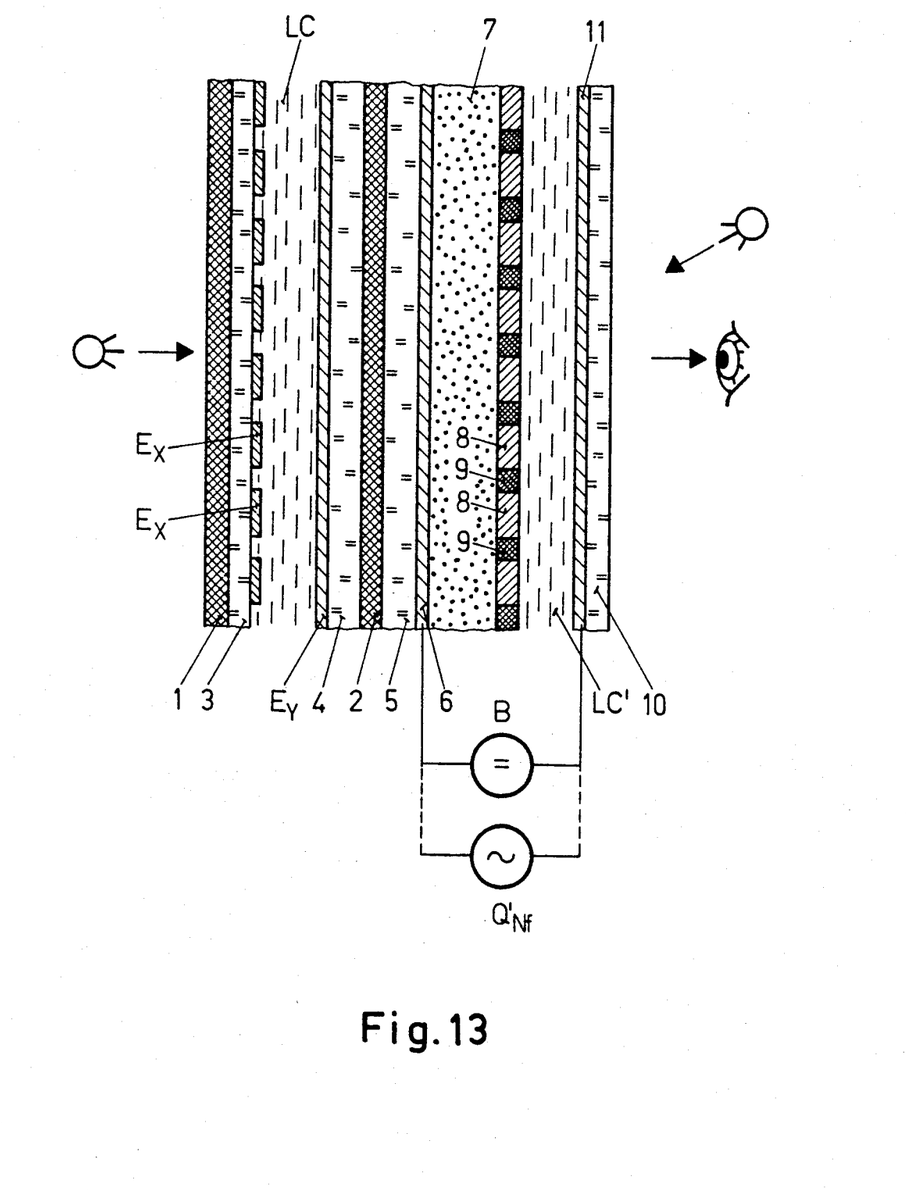
FIG. 13 is a cross sectional view of an arrangement for the temporary storage of image data, which can advantageously be employed in association with the above examples of display devices.

A storage arrangement based upon the above principle is illustrated by way of example in FIG. 13. The display device in accordance with the invention is arranged between two crossed polarizers 1, 2, for example, in the form of known polarizer foils. The display system between the polarizers corresponds in construction with the systems described above. It consists of two mutually parallel glass plates 3, 4 which are provided on those of their surfaces facing the liquid crystal LC, with electrodes $E_Y$ and $E_X$. The electrodes consist, for example, of tin dioxide ($SnO_2$). The polarizer 2 is followed by a further glass plate 5. On this, with the interposition of a layer 6 of tin dioxide, a photoconductor 7 of laminar form is provided. This consists, for example, of cadmium sulphide or amorphous selenium. Both substances are known photoconductors (see Electronic Image Storage, Academic Press, New York (1968)). The last mentioned substance in particular, i.e. amorphous selenium, is excellently suited to this application because its response time is only a few microseconds while its decay time may be several seconds.

That side of the photoconductor 7 facing away from the tin dioxide layer 6 is provided with a plurality of electrodes 8. The geometry of these electrodes and their distribution on said surface corresponds to the geometry of the matrix elements. The electrodes consist, for example, of gold and have a thickness such that the material is not transparent to light. The electrodes can equally well be made of some other material which is compatible both with the photoconductor 7 and with the second liquid crystal film LC' adjoining the electrodes 8. The space 9 between the electrodes 8 is filled with an electrically insulating material which is opaque, and which must also satisfy the above noted compatibility condition. The system is terminated by a further glass plate 10 which is provided on that of its surfaces facing the liquid crystal film LC', with a continuous tin dioxide electrode 11.

In order to simplify the illustration, the individual layers and films of FIG. 13 have not been shown to scale.

The display device, which as mentioned above, consists of the polarizers 1, 2, the glass plates 3, 4 with the intervening liquid crystal film LC, and the electrodes $E_X$ and $E_Y$ is connected in the same way as the arrangement of FIG. 7, for example. This has not been shown in FIG. 13. The remaining components of the system are connected up in the following manner.

Between the tin dioxide layer 6, which serves as a terminal electrode for the photoconductor 7 and the electrode 11, a direct voltage source B or a low frequency a.c. voltage source $Q'_{Nf}$ is connected. The terminal voltages of the sources B or $Q'_{Nf}$ are so chosen in this context that when a matrix element of the display device is not being driven, the voltage drop across the liquid crystal LC' is less than the threshold voltage $U_T$ of this substance, and that when a matrix element of the display device has been driven, because the photoconductor 7 becomes low in resistance, a voltage is developed across the liquid crystal film LC' which is substantially higher than the threshold voltage of the crystal. The last mentioned conditions are, however, easy to satisfy.

With the above described system a piece of information fed over only a very short time into the display device can be stored. Storage time is determined essentially by the properties of the photoconductor 7. Thus, when using the aforementioned substance, i.e. amorphous selenium, it may be several seconds. In this fashion, depending upon how the matrix elements are addressed, arbitrary two dimensional structures can be produced in the liquid crystal display, which are made up of successive image points, parts of rows or columns etc. In operation, a light source is provided directed toward the left side of the device and another light source is provided directed toward the right side of the device for use of the display in the conventional manner of this type of structure.

In each of the above described arrangements in accordance with the invention, it is to be particularly noted that the low frequency or direct current voltages for the excitation of selected cells, and the high frequency voltages, are applied directly to the cell of the matrices, i.e. without the necessity for employing additional switch means, such as non-linear switches at the individual matrix elements, in order to enhance the contrast between selected and non-selected elements. It is to be further noted that in the arrangements in accordance with the invention, switching of the matrix is greatly simplified, since in accordance with the teaching of the invention, it is not necessary to remove the low frequency or d.c. excitations of the matrix elements prior to the application of high frequency signals thereacross. In addition, the contrast enhancement arrangement in accordance with the invention are adaptable for use with present day liquid crystal layers having thicknesses less than above $10\mu$.

Although the invention has been described with reference to specific example embodiments, it is to be understood, that it is intended to cover all modifications and equivalents within the scope of the appended claims.

What is claimed is:

1. A driving circuit for a matrix addressed liquid crystal display device comprising a plurality of row and column electrodes forming a matrix, a liquid crystal disposed between said row and column electrodes, resistor means including a plurality of resistors, circuit means connecting one end of each row and column electrode to one end of a respective one of said resistors, further circuit means connecting the other ends of each resistor to a common point, said liquid crystal having a threshold such that low frequency voltages with a magnitude above said threshold cause dynamic scattering of light in said liquid crystal, said driving circuit further comprising first source means for providing a first electric voltage of a frequency less than a given low frequency and having a magnitude greater than the threshold voltage above which said dynamic scattering is caused, said given low frequency being in a frequency range in which the threshold of said liquid crystal means is substantially frequency independent, first means for applying said first electric voltage between selected row and selected column electrodes for causing dynamic scattering at the matrix crossings defined by said selected row and selected column electrodes, and second means including second source means for simultaneously applying a second voltage having a frequency higher than said given low frequency between said selected column and selected row electrodes and said common point so that said first and second voltage components are both present simultaneously at the crossings of non-selected electrodes with selected electrodes, said second voltage of a frequency higher than said given low frequency having a magnitude and frequency at which in combination with said first voltage the dynamic scattering is substantially completely suppressed, and the dynamic scattering due to said first electric voltage alone is not suppressed at the crossing of said selected row and selected column electrodes, whereby cross-talk is avoided.

2. The driving circuit of claim 1, wherein said first electric voltage having a frequency less than said given frequency is a time constant voltage.

3. The driving circuit of claim 1, wherein said first electric voltage having a frequency less than said given frequency is an alternating voltage.

4. The driving circuit of claim 1, wherein said second source means having a frequency higher than said given frequency is connected between said common point of said resistors and a point of reference potential.

5. The driving circuit of claim 1, wherein said common point of said resistors is connected to a point of reference potential, such as ground.

6. The driving circuit of claim 1, wherein said second source means having a frequency higher than said given frequency is connected between a point of reference potential and one terminal of said first source means for providing a first electric voltage, selector means for connecting the other terminal of said first source means to provide a first electric voltage to said selected row and column electrodes, and wherein said resistors connect said electrodes to said point of reference potential.

7. The driving circuit of claim 1, wherein said second source means having a frequency higher than said given frequency has one terminal connected to a point of reference potential, said circuit further including a pair of diode resistor networks connected to the other terminal of said second source means for producing a pair of opposite phase half wave voltages, said second source means further comprising selecting means for applying one of said half wave voltages to a row electrode and the other of said half wave voltages to a column electrode, said resistor means connecting said electrodes to said point of reference potential.

8. The driving circuit of claim 1, wherein said first source means comprises first and second voltage sources having a frequency less than said given frequency, said second source means further comprising a third voltage source of a frequency higher than said given frequency, and a change-over switch means connected between said first and second voltage sources and said selected row and column electrodes for changing the phase or polarity of the voltage applied between said selected row and column electrodes.

9. The driving circuit of claim 1, wherein said first source means comprise voltage divider means connected to separately control voltages applied to said electrodes, whereby the contrast of the cross-overs of said display device may be adjusted.

* * * * *

UNITED STATES PATENT OFFICE
CERTIFICATE OF CORRECTION

Patent No. 4,082,430             Dated April 4, 1978

Inventor(s) Peter U. Schulthess et al

It is certified that error appears in the above-identified patent and that said Letters Patent are hereby corrected as shown below:

In "Related U. S. Application Data", Item [60] replace

"Division of Ser. No. 562,548, Mar. 27, 1972, abandoned, which is a continuation-in-part of Ser. No. 238,576, Mar. 27, 1972, abandoned."  by --Division of Ser. No. 562,548, Mar. 27, 1975, abandoned, which is a continuation-in-part of Ser. No. 238,576, Mar. 27, 1972, abandoned.--.

Signed and Sealed this

Fifteenth Day of August 1978

[SEAL]

Attest:

RUTH C. MASON
Attesting Officer

DONALD W. BANNER
Commissioner of Patents and Trademarks